United States Patent
Bain et al.

(10) Patent No.: US 7,312,809 B2
(45) Date of Patent: Dec. 25, 2007

(54) METHOD AND APPARATUS FOR CONTROLLING A CONFERENCE CALL

(75) Inventors: John Robert Bain, Bovington (GB); Andrew Pepperell, Feltham (GB)

(73) Assignee: Codian Ltd., Langley, Slough (GB)

(*) Notice: Subject to any disclaimer, the term of this patent is extended or adjusted under 35 U.S.C. 154(b) by 0 days.

(21) Appl. No.: 10/962,912

(22) Filed: Oct. 12, 2004

(65) Prior Publication Data

US 2006/0077252 A1 Apr. 13, 2006

(51) Int. Cl.
*H04N 7/15* (2006.01)
(52) U.S. Cl. .................. 348/14.05; 348/14.09
(58) Field of Classification Search .. 348/14.01–14.16; 379/102.01–102.03
See application file for complete search history.

(56) References Cited

U.S. PATENT DOCUMENTS

| | | | |
|---|---|---|---|
| 4,650,929 A | | 3/1987 | Boerger et al. |
| 4,882,747 A | * | 11/1989 | Williams ............... 379/102.03 |
| 5,473,367 A | | 12/1995 | Bales et al. |
| 5,483,588 A | | 1/1996 | Eaton et al. |
| 5,495,522 A | | 2/1996 | Allen et al. |
| 5,600,646 A | | 2/1997 | Polomski |
| 5,640,195 A | * | 6/1997 | Chida .................... 348/14.01 |
| 5,771,273 A | | 6/1998 | McAllister et al. |
| 5,821,985 A | | 10/1998 | Iizawa et al. |
| 5,841,763 A | | 11/1998 | Leondires et al. |
| 5,867,653 A | | 2/1999 | Aras et al. |
| 5,872,922 A | | 2/1999 | Hogan et al. |
| 5,929,898 A | | 7/1999 | Tanoi |
| 5,982,459 A | | 11/1999 | Fandrianto et al. |
| 6,025,870 A | * | 2/2000 | Hardy .................... 348/14.1 |

(Continued)

FOREIGN PATENT DOCUMENTS

WO WO-96/08911 A1 3/1996

(Continued)

OTHER PUBLICATIONS

Addeo, E.J. et al. (Mar. 17, 1987). "A Multi-media Multi-point Communication Services Capability for Broadband Networks," *International Switching Symposium1987Proceedings*, Phoenix, AZ, Mar. 15-20, 1987, pp. C5.5.1-C5.5.6.

(Continued)

*Primary Examiner*—Stella Woo
(74) *Attorney, Agent, or Firm*—Morrison & Foerster LLP

(57) ABSTRACT

Provided is a method for controlling a Video Multi-Conference Unit (MCU) using an endpoint device. The MCU intercepts, interprets and acts upon commands sent across the communications network from the endpoint device. The commands may be sent using a user control device such as a control for controlling far-end cameras (FECC device) or by using dial-tones from a touchpad telephone. Also provided is a method for controlling a secondary device also connected to a conference call using the MCU. This secondary device may be another user endpoint or alternatively a video conference recorder (VCR). In order to control another user endpoint, the user may select a second mode in which the MCU forwards the commands to the endpoint rather than intercepting FECC or other commands sent to it using the user device. Alternatively, the MCU may interpret the FECC device commands and instruct the user device or VCR accordingly.

36 Claims, 5 Drawing Sheets

U.S. PATENT DOCUMENTS

| | | | |
|---|---|---|---|
| 6,128,649 | A | 10/2000 | Smith et al. |
| 6,215,515 | B1* | 4/2001 | Voois et al. ............. 348/14.01 |
| 6,366,771 | B1 | 4/2002 | Angle et al. |
| 6,370,113 | B1 | 4/2002 | Paradiso et al. |
| 6,445,472 | B1 | 9/2002 | Kim et al. |
| 6,496,216 | B2 | 12/2002 | Feder et al. |
| 6,574,469 | B1 | 6/2003 | Xiang et al. |
| 6,577,712 | B2 | 6/2003 | Larsson et al. |
| 6,584,076 | B1 | 6/2003 | Aravamudan et al. |
| 6,590,604 | B1* | 7/2003 | Tucker et al. ............ 348/14.13 |
| 6,614,465 | B2* | 9/2003 | Alexander et al. ....... 348/14.05 |
| 6,614,845 | B1 | 9/2003 | Azadegan |
| 6,633,324 | B2 | 10/2003 | Stephens, Jr. |
| 6,697,476 | B1 | 2/2004 | O'Malley et al. |
| 6,750,896 | B2 | 6/2004 | McClure |
| 6,757,005 | B1 | 6/2004 | Elbaz et al. |
| 6,760,749 | B1 | 7/2004 | Dunlap et al. |
| 6,771,779 | B1 | 8/2004 | Eriksson et al. |
| 6,810,035 | B1 | 10/2004 | Knuutila et al. |
| 6,989,856 | B2 | 1/2006 | Firestone et al. |
| 7,113,200 | B2 | 9/2006 | Eshkoli |
| 2002/0044201 | A1* | 4/2002 | Alexander et al. ....... 348/14.05 |
| 2004/0207724 | A1* | 10/2004 | Crouch et al. ........... 348/14.09 |
| 2005/0248652 | A1 | 11/2005 | Firestone et al. |
| 2006/0026002 | A1* | 2/2006 | Potekhin et al. ............ 704/275 |
| 2006/0164507 | A1 | 7/2006 | Eshkoli et al. |
| 2006/0164508 | A1 | 7/2006 | Eshkoli et al. |

FOREIGN PATENT DOCUMENTS

| | | |
|---|---|---|
| WO | WO-03/063484 A1 | 7/2003 |

OTHER PUBLICATIONS

Bernard, J.D. (Jun. 1, 1999), "Streaming Services Manual: Installation and Operation," 156 pages.

Boyer, D.G. et al. (Oct. 1994). "The Personal Presence System - A Wide Area Network Resource for the Real Time Composition of Multipoint Multimedia Communications," *ACM Multimedia'94 Proceedings*, San Francisco, CA, Oct. 15-20, 1994, pp. 453-460.

Compression Labs, Incorporated. (1993-1996). "Multipoint 2™: Multimedia Conference Server, Release 5.1 Administration Guide," 406 pages.

Gong, F. (1994). "Multipoint Audio and Video Control for Packet-based Multimedia Conferencing," *ACM Multimedia'94 Proceedings*, San Francisco, CA, Oct. 15-20, 1994, pp, 425-432.

Holfelder, W. (Oct. 1998). "Interactive Remote Recording and Playback of Multicast Videoconferences," *Computer Communications*21(15):1285-1294.

Horn, D.N. et al. (Jan./Feb. 1993). "A Standards-based Multimedia Conferencing Bridge," *AT&T Technical Journal*72(1):41-49.

International Telecommunication Union. (Feb. 1998). "H.323: Packet-based Multimedia Communications Systems," 128 pages.

International Telecommunication Union. (Nov. 2000). "H.323 Annex M.1: Tunnelling of Signalling Protocols (QSIG) in H. 323," 6 pages.

International Telecommunication Union. (Jul. 2001). "H.323 Annex M3: Tunnelling of DSS1 Through H.323," 10 pages.

International Telecommunication Union. (Jul. 2001). "H.323 Annex Q: Far-end Camera Control and H.281/H.224," 9 pages.

Johnson, J.T. (Aug. 1992). "Mix-and-Match Videoconferencing," *Data Communications*, pp. 73-74.

Lukacs, M.E. (Oct. 1994). "The Personal Presence System - Hardware Architecture," *ACM Multimedia'94 Proceedings*, San Francisco, CA, Oct. 15-20, 1994, pp. 69-76.

Microsoft Corporation. (Date Unknown). "NMR_901," located at <http://www.microsoft.com/windows/NetMeeting/Corp/reskit/images/NMR_901.GIF>, last visited Mar. 19, 2006, 1 page.

Microsoft Corporation. (Last updated Dec. 10, 1999). "Chapter 1: Installation Requirements and Setup," located at <http://www.microsoft.com/windows/NetMeeting/Corp/reskit/Chapter1/default,asp>, last visited Mar. 22, 2006, 8 pages.

Microsoft Corporation. (Last updated Dec. 10, 1999). "Chapter 2: Resource Kit Wizard," located at <http://www.microsoft.com/windows/NetMeeting/Corp/reskit/Chapter2/default.asp>, last visited Mar. 22, 2006, 15 pages.

Microsoft Corporation. (Last updated Dec. 10, 1999). "Chapter 4: Firewall Configuration," located at <http://www.microsoft.com/windows/NetMeeting/Corp/reskit/Chapter4/default.asp>, last visited Mar. 22, 2006, 6 pages.

Microsoft Corporation. (Last updated Dec. 10, 1999). "Chapter 7: Network Bandwidth Considerations," located at <http://www.microsoft.com/windows/NetMeeting/Corp/reskit/Chapter7default.asp>, last visited Mar. 22, 2006, 43 pages.

Microsoft Corporation. (Last updated Dec. 10, 1999). "Chapter 8: NetMeeting Architecture," located at <http://www.microsoft.com/windows/NetMeeting/Corp/reskit/Chapter8/default,asp>, last visited Mar. 22, 2006, 4 pages.

Microsoft Corporation. (Last updated Dec. 10, 1999). "Chapter 9: Product Interoperability," located at <http://www.microsoft.com/windows/NetMeeting/Corp.reskit/Chapter9/default.asp>, last visited Mar. 22, 2006, 4 pages.

Microsoft Corporation. (Last updated Dec. 10, 1999). "Chapter 10: Understanding the T.120 Standard," located at <http://www.microsoft.com/windows/NetMeeting/Corp/reskit/Chapter10/default.asp>, last visited Mar. 22, 2006, 9 pages.

Microsoft Corporation. (Last updated Dec. 10, 1999). "Chapter 11: Understanding the H.323 Standard," located at <http://www.microsoft.com/windows/NetMeeting/Corp/reskit/Chapter11/default.asp#mcu>, last visited Mar. 19, 2006, 11 pages.

Microsoft Corporation. (Last updated Dec. 15, 1999). "Chapter 3: Finding People," located at <http://www.microsoft.com/windows/NetMeeting/Corp/reskit/Chapter3/default.asp>, last visited Mar. 22, 2006, 7 pages.

Microsoft Corporation. (Last updated Dec. 15, 1999). "Chapter 5: NetMeeting Security," located at <http://www.microsoft.com/windows/NetMeeting/Corp/reskit/Chapter5/default.asp>, last visited Mar. 22, 2006, 13 pages.

Microsoft Corporation. (Last updated Dec. 15, 1999). "Chapter 12; Conferencing Standards," located at <http://www.microsoft.com/windows/NetMeeting/Corp/reskit/Chapter12/default.asp>, last visited Mar. 22, 2006, 4 pages.

Microsoft Corporation. (Last updated Jan. 3, 2000). "Chapter 6: Using NetMeeting on Intranet Web Pages," located at <http://www.microsoft.com/windows/NetMeeting/Corp/reskit/Chapter6/default.asp>, last visited Mar. 22, 2006, 11 pages.

Niblett, P.D. et al. (Oct. 1994). "Control of Video Telephony From a Data Conferencing System," *IBM Technical Disclosure Bulletin*37(10):327-332.

Parnes, P. et al. (1997). "mTunnel: A Multicast Tunneling System With a User Based Quality-of-Service Model," *Interactive Distributed Multimedia Systems and Telecommunication Services*, pp. 53-62.

Toga, J. (2000). "Introduction to H.323," 10 pages.

VCON Ltd. (2001). "VCON Conferencing Systems, MeetingPoint® Version 4.6 User's Guide," 222 pages.

White Pine Software, Inc. (Date Unknown). "MeetingPoint™ Conference Server," 19 pages.

Willebeek-LeMair, M.H. et al. (1994). "On Multipoint Control Unit for Videoconferencing," 19th *Conference on Local Computer Networks Proceedings*, Minneapolis, MN, Oct. 2-5, 1994, pp. 356-364.

\* cited by examiner

METHOD AND APPARATUS FOR CONTROLLING A CONFERENCE CALL

CROSS-REFERENCE TO RELATED APPLICATIONS

Not Applicable

STATEMENT RE: FEDERALLY SPONSORED RESEARCH/DEVELOPMENT

Not Applicable

BACKGROUND OF THE INVENTION

This invention relates to a method of controlling a multi-conference unit or other endpoint device in a communications network. The invention is applicable to use within video conference calls.

In recent years it has become more common for people to contact each other using video calling where each participant in the call can see the other participant. This is useful as it allows users to gauge the responses and reactions of users according to their body language and not just their voice.

When more than one user takes part in a video call it is known as a video conference call. The data streams from each user may be transmitted directly between each participant in the conference call or, more commonly, are directed through a Video Multi-conference Unit (MCU) to which the participants in a video conference connect. The data streams from the participants are sent to the MCU and the participants each receive one stream comprising data encoding a composed or voice-switched image of the other participants in the conference call.

Whilst using an MCU reduces the amount of data transmitted across the network during a conference call it also means that there is a separate entity, remote from any of the end point devices the participants of the conference are using, that needs to be configured so that it can control each conference call routed through it according to the call's specific requirements.

Traditionally, the MCU is controlled by establishing a separate control channel between it and a control device. Control commands are sent across the control channel to the MCU. The commands sent to control the MCU are usually sent from a "command-line" text based interface. Commanding the MCU in this manner requires MCU configuration expertise and programming skills on behalf of at least one of the participants. Hence, it is often difficult or expensive to find someone who is able to configure the MCU effectively for each conference call that is to be made using it.

Furthermore, advanced MCUs need further control as the MCU enables each user to choose which other participants are displayed and heard by that user. This choice may be varied at any time during the conference. For each user to get the optimal result from an advanced MCU each user would have to be able to control the MCU using a "command-line" text based interface.

In recent years web-based interfaces for configuring the MCU have been developed. These whilst being easier to control than basic command-line interfaces for the average user, still require the user who is to configure the MCU to have to have some expertise in order to configure the MCU in the optimal manner for each video conference call made using it.

Finally, whether using a "command-line" text based interface or a web-based interface control of the MCU requires the additional equipment of the control device and an additional communications link for conveying command messages from the control device to the MCU. The use of a web-based interface also adds extra complexity to the system. These requirements increase the cost of providing the conferencing service.

In order to try to overcome these problems the ITU-T standard H.245 specifies conference control messages. However, these messages only cover a limited range of actions and most video endpoints cannot generate H.245 conference control messages.

BRIEF SUMMARY OF THE INVENTION

According to a first aspect of the invention there is provided a method for controlling a multi-conference unit (MCU) in a communications network comprising an endpoint device comprising the steps of sending a command to said MCU using said endpoint device, intercepting said command sent by said endpoint device across said network using said MCU, said MCU carrying out said commands received by said MCU.

Preferably the MCU forwards the command to a second device wherein in response to a command received from the endpoint. This allows a user at an endpoint to control a second endpoint connected to the MCU. This endpoint may be a video conference recorder or another endpoint device.

Preferably the MCU only forwards the command for a specified period of time. Thereby allowing the endpoint to control the MCU after controlling the endpoint device.

According to a further aspect of the invention there is provided an MCU connectable to a communications network comprising an endpoint device, the MCU comprising: an input for receiving commands from an endpoint connected to said communications network and a processor for processing said commands.

Preferably the MCU further comprises an output for transmitting received commands to a second device, such as a video conference recorder or other video endpoint, connected to the communications network. In this way a user at an endpoint can control a far-end camera or video conference recorder remotely.

According to a further aspect of the invention there is provided a video conference network comprising: an MCU and an endpoint, the MCU acting to intercept commands from said endpoint.

Other aspects and features of the present invention will become apparent to those ordinarily skilled in the art upon review of the following description of specific embodiments of the invention in conjunction with the accompanying figures.

BRIEF DESCRIPTION OF THE DRAWINGS

Embodiments of the invention will now be described, by way of example, and with reference to the drawings in which.

DETAILED DESCRIPTION OF THE INVENTION

Network Overview

Figure 1:
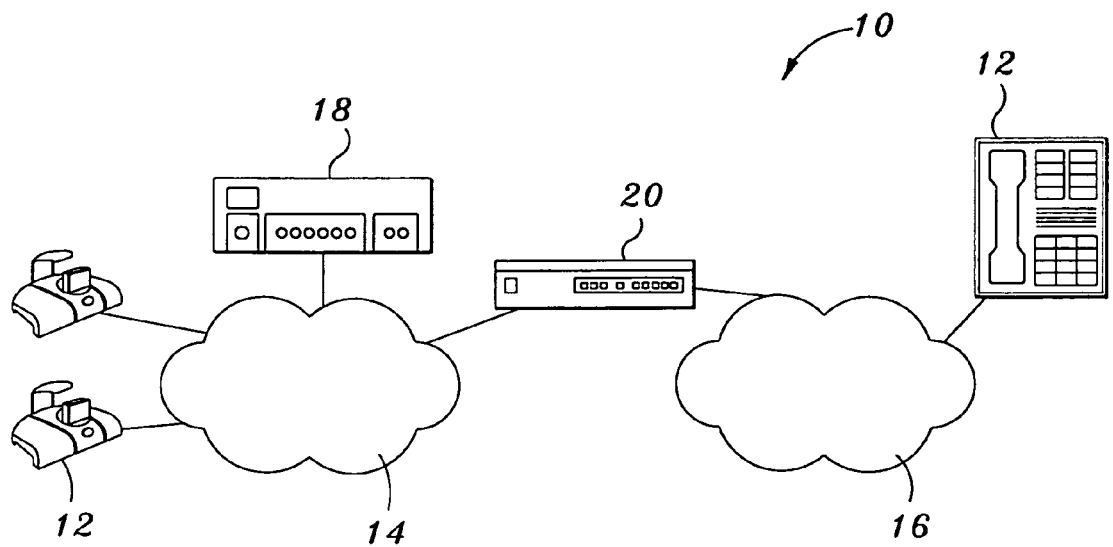
FIG. 1 illustrates an overview of a network set up for video conferencing using an MCU.

Illustrated in FIG. 1 is an example of a communications network 10 in which the present invention may be applied. Each user is connected to the communications network through an endpoint apparatus 12. The endpoint apparatus is described in more detail below.

Preferably the communications network is an internet protocol (IP) network 14. However, users may also be connected to a different communications network such as the Integrated Digital Services Network (ISDN) 16. An MCU 18 is also connected to a communications network 14, 16 over which the video conference call will be provided and is provided with its own endpoint identifier (ID).

If users from more than one type of communications network wish to participate in a single video conference call provided using an MCU 18, the two communications networks may be linked using a gateway 20. The gateway allows translation of data transmitted using different protocols into the protocols appropriate for transmission of data across each type of network.

Alternatively, it may be required that users who are connected to an IP network using a Local Area Network (LAN) (not shown) participate in a video conference call with users outside the LAN. Often in this type of network set up the LAN is provided with a firewall between itself and the external network to prevent unsecured access from the external network to its internal network. In this case the MCU may be provided with connections to both the external and internal network. In this way any protection mechanisms set up, for example by use of a firewall, for the internal network do not have to be reconfigured every time an internal network user wishes to take part in a video conference.

The Endpoint Apparatus

The endpoint apparatus is a device connectable to a communications network for video and/or audio conferencing which enables a user to send information across and receive information from the communications network.

For a video conference the endpoint apparatus may be a traditional telephone handset if the user is only connecting to receive audio data. However, more commonly the endpoint apparatus will enable video data to be received from and transmitted across the communications network and also be displayed to the user. A video endpoint such as this will commonly consist of a microphone, speaker, camera, display, processor, a device for user control input and a network connection to allow data to be passed to and from a communications network. The endpoint device is preferably an H.323 or SIP endpoint if it is connected to an IP network or an H.320 endpoint if it is connected to an ISDN network. H.323 and H.320 are standards defined by the International Telecommunications Union.

An endpoint may also be provided with a far-end camera control (FECC) facility. The FECC facility may be accessed by selecting buttons 24–36 on a user input device 22 such as the one illustrated in FIG. 2. The FECC commands travel down the same communications link as the audio and video data and act to control another end point device. For example, they allow a user to cause another camera, other than their own, to pan, zoom, tilt or focus. The commands may be sent from the controlling endpoint to the other endpoint using a signaling protocol message such as ITU-T H.281 or H.323 Annex Q. How the commands can control an MCU is discussed in more detail below.

Some endpoints have user input devices which cannot send FECC commands across a network, for example where a simple telephone is used to access the audio data of the conference. In this instance commands could be sent using the audio data stream across the network. This can be done because all data to do with the conference is sent via the MCU. If a telephone is being used as the FECC device then the MCU can interpret Dual Tone Multi-Frequency (DTMF) signals sent by selecting a key on the telephone in the same way as it interprets a FECC command sent by pressing a button on the user input device.

The MCU

As stated before the MCU is connected to a communications network. It receives all the data streams from participants in a single conference and transmits conference data encoding a composed or voice-switched image of the other participants in the conference to an individual endpoint using a single communications link. In this way the volume of data, which needs to be communicated across the network during a video conference call, is reduced. Preferably the MCU has the appearance of another endpoint to all other endpoints connected to the communications network.

Figure 3:
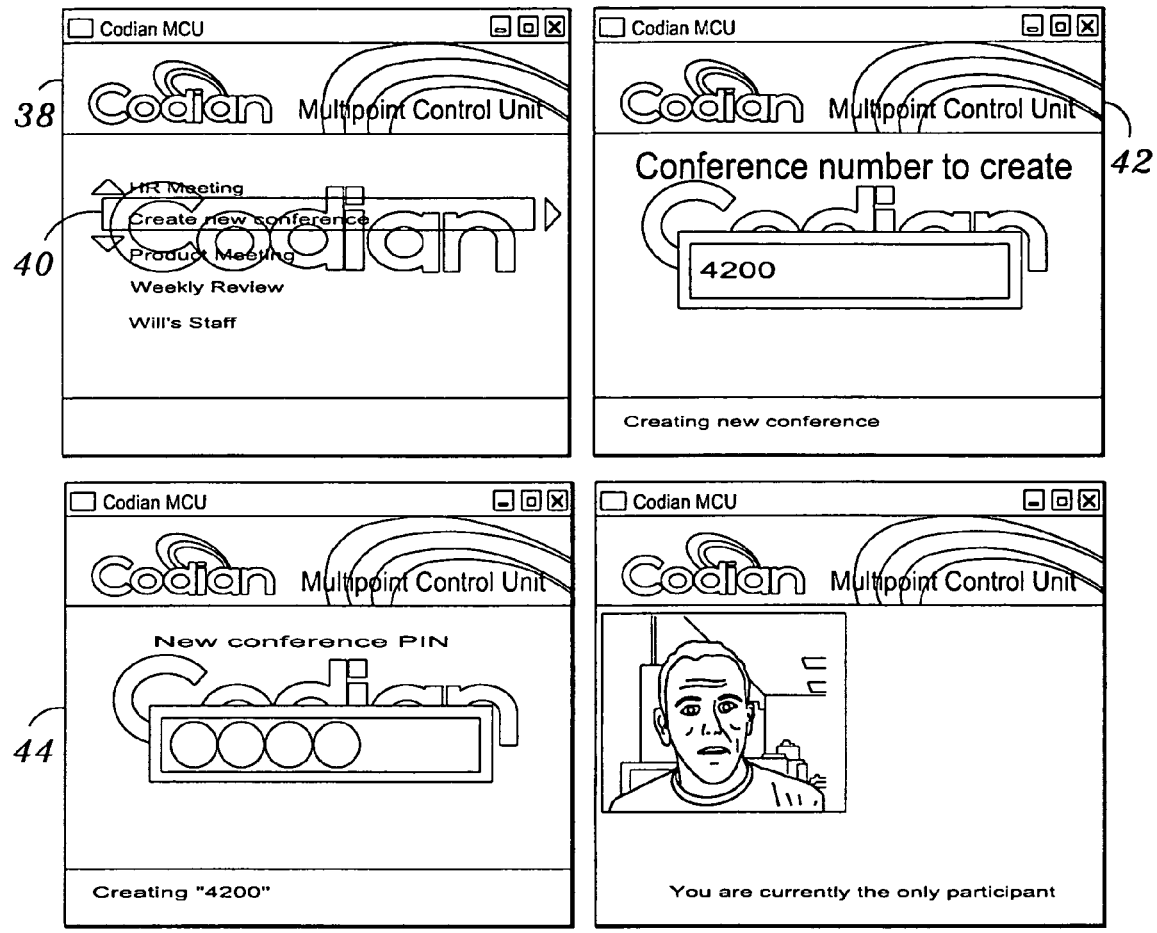
FIG. 3 illustrates user interfaces for setting up a conference call.

The MCU is also configured to generate a user interface, such as those shown in FIG. 3, which can be displayed to a user at any endpoint connected to the MCU. The user interface allows users to communicate with, and provide commands to the MCU. This interface preferably consists of user screens and menus and is automatically displayed when the user connects to the MCU.

As all messages, including data and signaling protocol messages, sent from the endpoints participating in the video conference call to other endpoints connected to the conference call pass through the MCU, the MCU is able to intercept any FECC commands. This interception may be done by the MCU automatically identifying, intercepting and processing any FECC commands sent across the communications network directed to itself as an endpoint. Alternatively the FECC commands may be addressed to the endpoint ID associated with the MCU with only these FECC commands intercepted and processed by the MCU.

Setting Up a Conference

Figure 2:
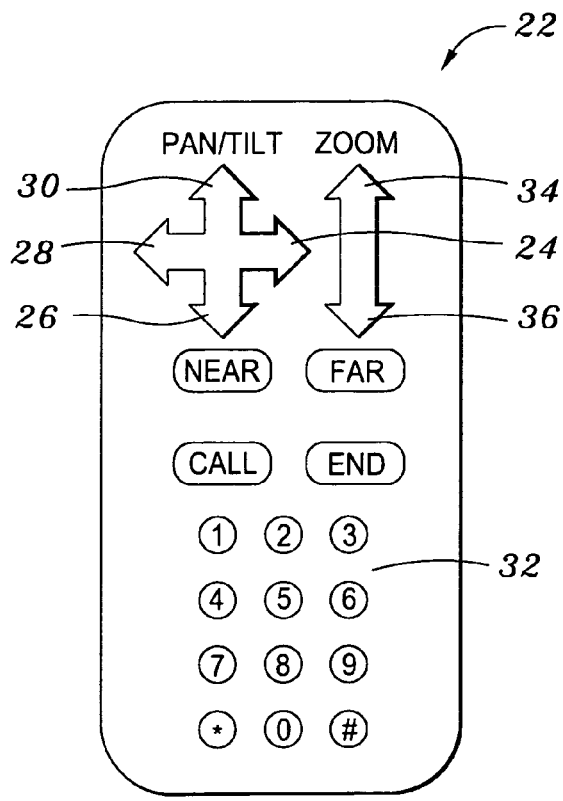
FIG. 2 illustrates an FECC control apparatus.

This is described with reference to FIGS. 2 and 3. In order to set up a conference a user at an endpoint has to contact the MCU using a number associated with the MCU. Once the endpoint is connected to the MCU an interface, like 38 shown in FIG. 3, will be displayed on the display of the endpoint. This can be done automatically because the endpoint considers the MCU to be the same as any other video endpoint on the network and, therefore, the MCU's data transmissions will be projected onto the screen in the same way as transmissions from a "normal" endpoint connected to the network.

As described above each of the buttons 24–36 on the user input device 22 are associated with a particular FECC command and result in the corresponding message being sent across the communications network to the MCU. By sending a certain FECC command to the MCU the user can instruct it to take certain actions. For example, the button 24 instructing a far end camera to pan right may be intercepted by the MCU when a user is viewing user interface 38 and interpreted as a command for selecting that item, in this case "Create new conference" in the menu. Conversely, if a user wrongly selects an item in a menu they may return to the previous menu by selecting the pan left button 28.

To set up a new conference the user may select the "Create new conference" item 40 on the menu displayed on the user interface 38 using the pan right button 24 on the user input device 22. The user will then be asked to provide a name for a conference and a conference pin (shown as 42 and 44 respectively). The name and pin may be provided by scrolling through an alphabet using the PAN/TILT controls 24–30 or using the number keypad 32. The conference is then set up.

Alternatively, the user may select an option where the user is allowed to specify which users should participate in a pre-arranged conference, by providing endpoint numbers to the MCU and the time at which the conference is to take place again using the number keypad 32 provided on the user input device 22. These may all be selected using the FECC commands applied to a menu supplied by the MCU and result in the MCU calling the supplied endpoint numbers at the appropriate time. If a supplied endpoint number is not answered the MCU may retry to contract it for a pre-specified number of times, or for a pre-specified period of time.

Joining a Conference

Figure 4:
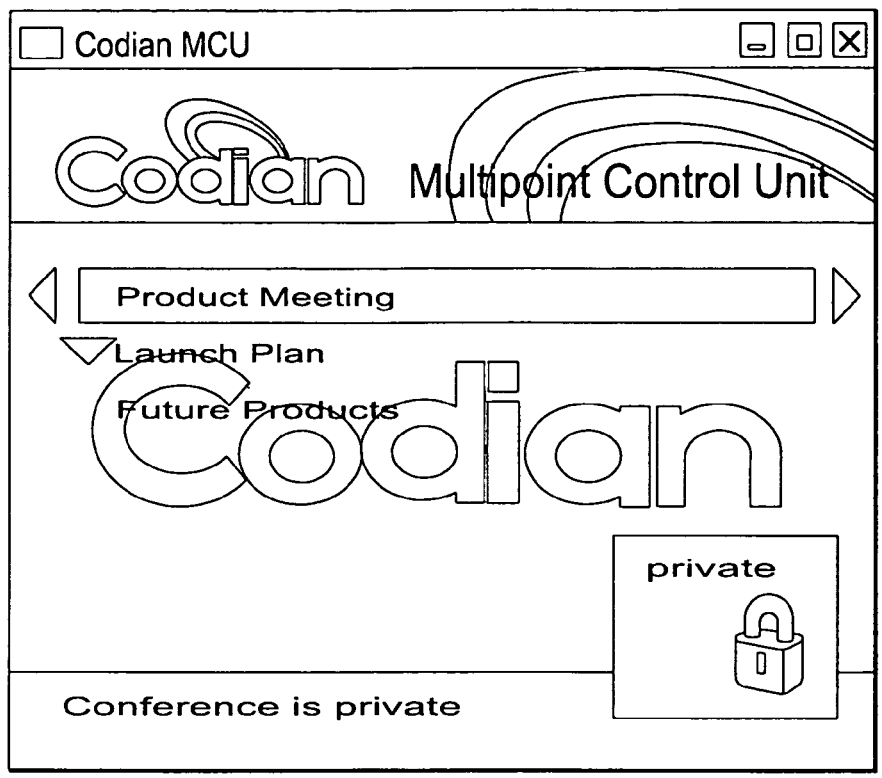
FIGS. 4, 5 and 6 illustrate user interfaces for selecting a conference call.
Figure 5:
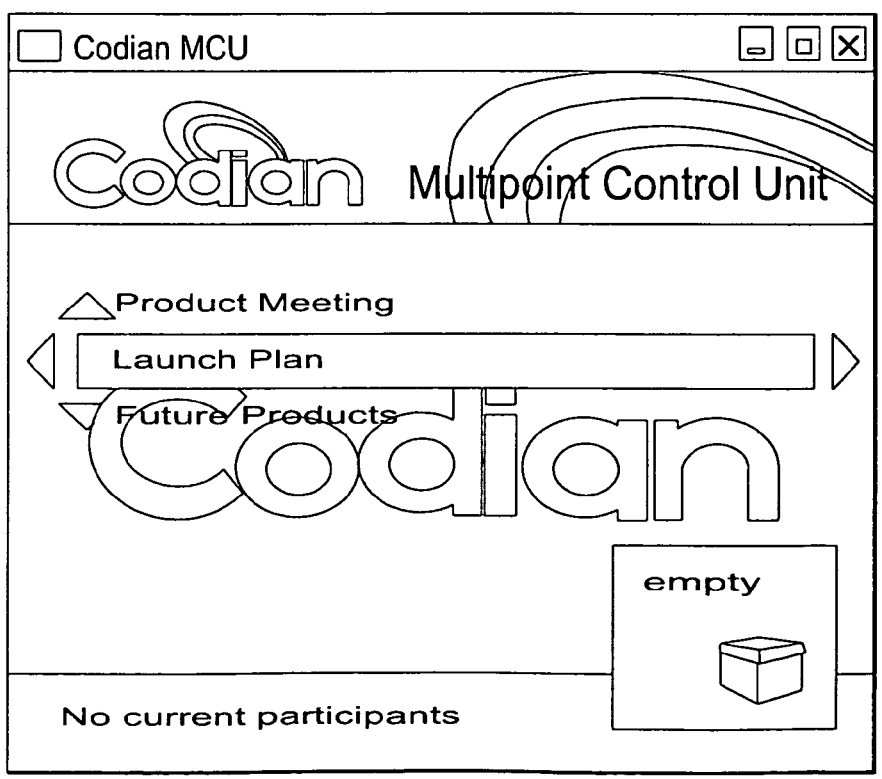
Figure 6:
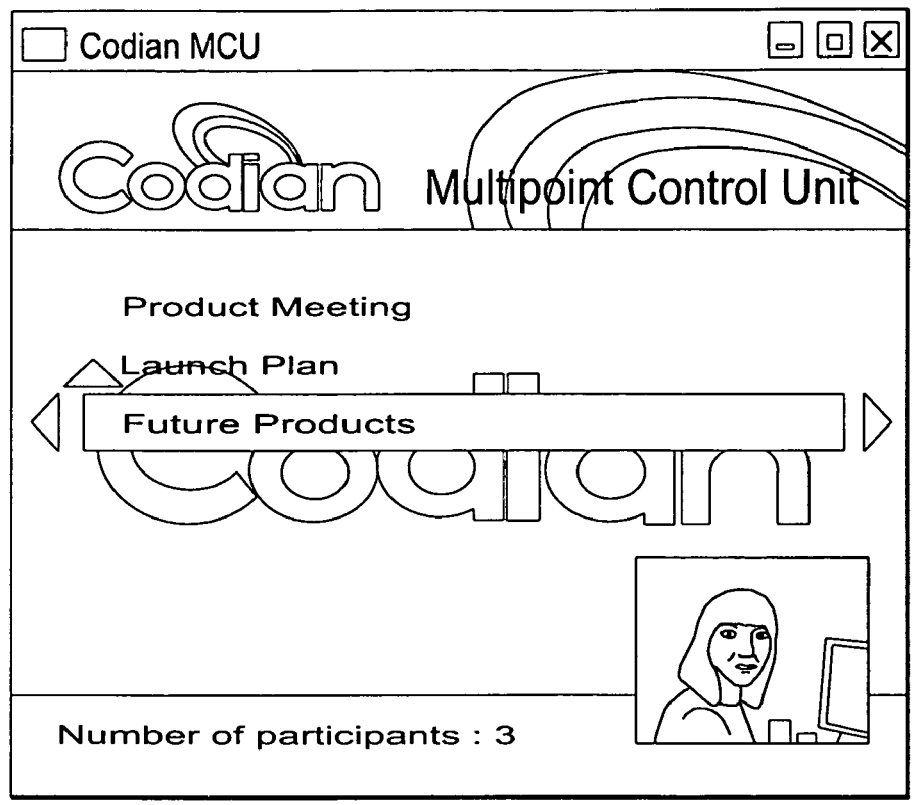

If the user is to take part in a pre-arranged conference then the MCU will be set-up to contact an appropriate endpoint at a pre-arranged time. Alternatively, if this is not the case, the user may dial the MCU to view a list of conferences which are currently taking place as illustrated in FIGS. 4 to 6. The MCU may be configured to describe the type of conference that is taking place. For example, as illustrated in FIG. 4, the "Product meeting conference" is private. The icon 30 and the statement at the bottom of the interface illustrate this. A user presented with this type of interface cannot join the video conference unless they have a PIN.

The pan down 26 and pan up 30 buttons on the user device may be used to send FECC commands to the MCU and thereby navigate down or up the list of conferences respectively. For example, FECC commands can be used to navigate down this list to see that the "Launch Plan" conference, shown in FIG. 5, has no participants and the "Future Products" conference, shown in FIG. 6, has three participants. On selecting the pan right button 24 on the user input device 22 an FECC command is sent to the MCU which is interpreted by the MCU as selecting the conference.

Once a user has joined a conference the user input device can be used to view different types of screen layouts. For example, the pan up and down buttons 26 and 30 on the user input device 22 may be used to select different screen layouts whereas the pan left and right buttons 24 and 28 on the user input device 22 may be used to select which user is to be shown in the main view.

When setting up the conference there may be certain properties given to the presentation of the participants in the conference with a default participant being displayed in the main view. For example, the MCU may be instructed to always show the current speaker or a selected person in the main screen for a certain conference call.

Additionally, the FECC commands may be used to select which participants are to be displayed or heard during a conference or at a certain point in a conference. Preferably this is the default operation when a user having a users input device is participating in a conference. Preferably, the tilt up and tilt down buttons are used to change the screen layout on the user interface and the pan right and pan left buttons are used to change which participant is viewed in the main view.

Other interfaces may also be provided by the MCU allowing users when they select a particular button on the user input device to view a list of all participants within a particular video conference call, to customize the view of the participants within the conference call further or disable their video stream, or selectively allow users to view a video stream or listen to audio, giving the user privacy.

Controlling Other Devices Using FECC Commands to an MCU

Far-end Camera Control

Conventional video conferences that use an MCU do not usually facilitate the use of a FECC enabled user input device to control a far end device. For a FECC command to be communicated to a far end device it is usual that the two endpoints are joined by a direct connection.

Figure 7:
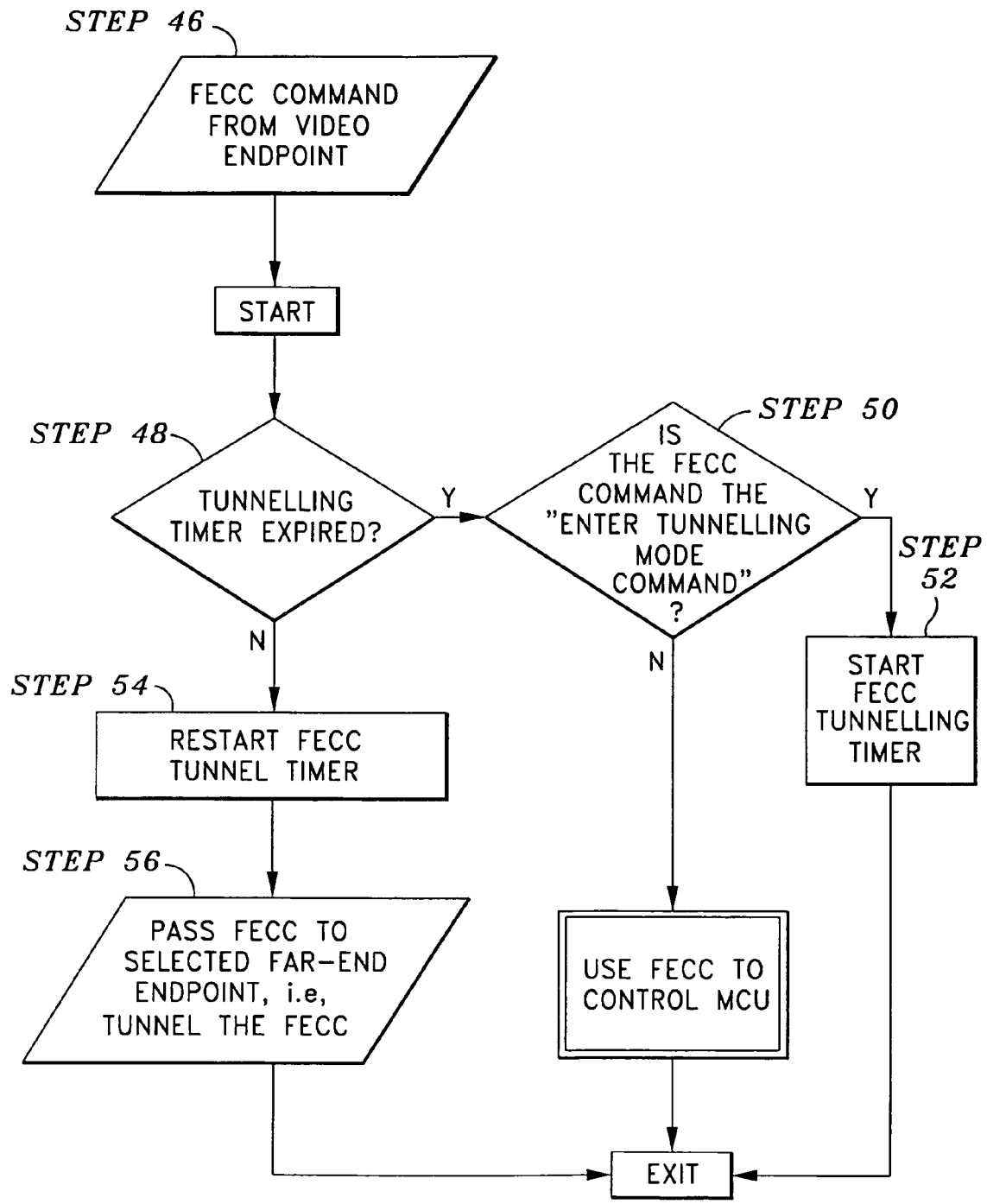
FIG. 7 illustrates a flow diagram showing how FECC commands can be used to control a far end camera.

A button may be selected on the current FECC device which allows the user to select a "Far End Camera Control Tunnelling" mode as shown in Step 46 of FIG. 7. For example, if the MCU is intercepting all FECC messages the user may select the "Far End Camera Control Tunnelling" mode by selecting a button such as the zoom in or zoom out button on the user input device.

Figure 8:
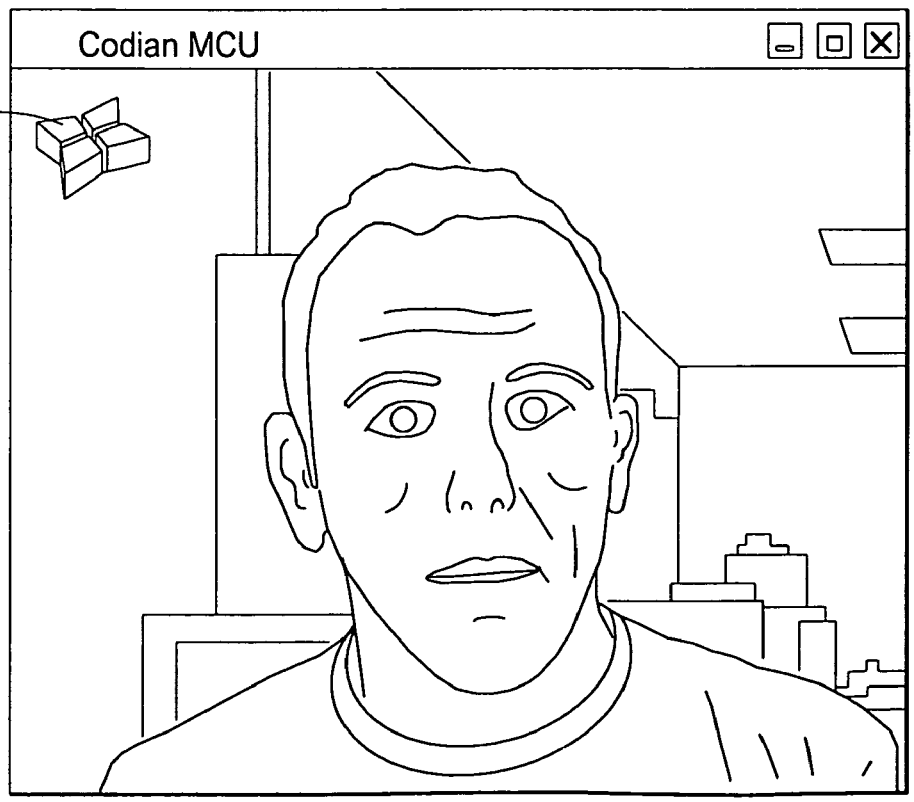
FIG. 8 illustrates a user interface where a device is being used to control a far endpoint camera.

When this button is selected the MCU is sent a command to enter FECC Tunnelling mode. If the MCU is not in FECC Tunnelling mode then it will enter FECC tunnelling mode as shown in steps 48 and 50 of FIG. 7. The user interface may indicate that this mode is active by displaying an icon such as shown in FIG. 8.

When the MCU is in FECC Tunnelling mode any FECC commands which are sent to the MCU will, rather than being intercepted by the MCU, be directed to the selected endpoint enabling a user to control a far end camera. In this way a user can control a far end camera using FECC commands.

FECC Tunnelling mode may be exited automatically after a set period of time from the last command being sent to an end camera. If this is the case then when a command to enter FECC Tunnelling mode is received by the MCU the MCU will start an FECC timer as shown in Step 52. Once the FECC timer set period of time has elapsed the MCU will exit FECC Tunnelling mode.

Any FECC commands received by the MCU from the user who initiated FECC Tunnelling mode during this period of time will cause the FECC timer to restart as shown in step 54 and the MCU will forward any commands to the selected endpoint as shown in step 56. Alternatively FECC Tunnelling mode may be exited by pressing a button on the FECC control device.

Video Conference Recorder

Video conference recorders (VCRs) are devices used to make recordings of video conferences which can then be viewed using a standard video endpoint or computer.

When a user wishes to view a recorded video conference they dial the number for the VCR and connect to the VCR directly. Once connected to the VCR they are presented with an interface having a similar presentation to those for creating and joining a conference. Preferably, the interface presents a list of recorded sessions which are available for viewing. The recorded session to be viewed may be selected in the same way as described above for selecting a conference to join.

Once a session has been selected to be viewed then the playback of the session begins automatically. The user input device 22 as shown in FIG. 2 is preferably used to pause, restart, fast forward and rewind the recording. Preferably selecting the tilt down button 26 causes the playback to pause and selecting the tilt up button 30 restarts the playback. Preferably, the pan left button 28 can cause the playback to skip back, slow down (if the playback has been speeded up) to normal speed and the pan right button 24 can cause the playback to restart, skip forward, start playing at a faster speed.

A user can also choose to record a video conference using the MCU. When a user selects this option the MCU connects to the VCR as if it was another endpoint. The MCU then sends conference data to the VCR for it to record it. It does this in the same way that it would send conference data to another endpoint. However, the VCR does not have a channel for sending data to the MCU because of this the MCU does not include the video in the video conference data sent to participants in the call.

In order for a VCR to be used in this way it must be able to decode FECC messages. Preferably the user input device is able to send FECC commands to the VCR to cause it to record.

What is claimed is:

1. A method of controlling a multi-point control unit (MCU) in a communications network having a terminal device, the method comprising:
    (a) sending a user command message to said MCU using said terminal device, wherein the user command message is for controlling a camera device;
    (b) receiving said user command message sent by said terminal device across said network at said MCU;
    (c) said MCU identifying whether the received user command message is intended for said MCU; and
    (d) said MCU performing an action based on the at least one command included in said user command message received by and intended for said MCU.

2. A method as claimed in claim 1 wherein in response to a user command message received from said terminal device said MCU forwards said command over the network.

3. A method as claimed in claim 2 wherein said user command message is forwarded to a second device, said second device comprising a video conference recorder.

4. A method as claimed in claim 3 wherein said user command message comprises a far end camera control command message operable for controlling an operation of the video conference recorder.

5. A method as claimed in claim 2 wherein the user command message is forwarded to a second device, the second device comprising another terminal device.

6. A method as claimed in claim 1 wherein said user command message comprises a far end camera control message.

7. A method as claimed in claim 1 wherein said terminal device is selected from the group comprising an H.320, H.323 and SIP Video Endpoint.

8. A method as claimed in claim 1 wherein said user command messages are selected from the group comprising H.320, H.323 and SIP messages.

9. A method as claimed in claim 1, wherein said MCU alters the composition of a video communication in response to the at least one command included in said user command message.

10. A method of controlling a multi-point control unit (MCU) in a communications network having a terminal device, the method comprising:
    (a) sending a user command message to said MCU using said terminal device;
    (b) receiving said user command message sent by said terminal device across said network at said MCU;
    (c) said MCU identifying whether the received user command message is intended for said MCU; and
    (d) said MCU carrying out at least one command included in said user command message received by and intended for said MCU, wherein a command is operable to cause said MCU to forward said user command message for a predetermined period of time.

11. A multi-point control unit (MCU) connectable to a communications network comprising a terminal device, the MCU comprising:
    (a) an input couplable to the network and adapted for receiving a user command message from a terminal device connected to said communications network wherein said user command message is for controlling a camera device; and
    (b) a processor coupled to the input and adapted to process said user command message intended for said MCU wherein said MCU is configured to perform commands contained within said command message, and wherein one or both of said input and processor are configured to identify whether said user command message is intended for said MCU..

12. An MCU as claimed in claim 11 further comprising an output coupled to said processor and adapted for transmitting a user interface to said communications network.

13. An MCU as claimed in claim 11 further comprising an output coupled to said processor and adapted for transmitting received commands to a second terminal device connected to the communications network.

14. An MCU as claimed in claim 13 wherein said second terminal device is a video conference recorder.

15. An MCU as claimed in claim 13 wherein the transmitted commands are transmitted in a format for receipt by a terminal device selected from the group comprising an H.320, H.323 and SIP Video Endpoint.

16. An MCU as claimed in claim 11 wherein said input is adapted to couple to a communications network selected from the group comprising an ISDN and IP communications network.

17. An MCU as claimed in claim 11 wherein said user command messages are selected from the group comprising H.320, H.323 and SIP messages.

18. A MCU as claimed in claim 11 wherein said user command message comprises a far end camera control command message.

19. A MCU as claimed in claim 18 wherein said far end camera control command message is operable to control an operation of the MCU and alter a characteristic of a video conference.

20. A MCU as claimed in claim 11 wherein said MCU alters the composition of a video communication in response to said user command message.

21. Video conference appartus comprising:
    (a) a multi-point control unit (MCU) having a processor and couplable to a link;
    (b) a terminal device configured for sending a user command message over the link; wherein:
    said user command message is for controlling a camera device;
    said processor is adapted to process said user command message;
    said MCU is configured to identify whether said user command message is intended for said MCU;
    said MCU including an input for receiving said user command message from said link; and said MCU is configured to perform commands including said user command message intended for said MCU.

22. A method of controlling a control unit adapted for coupling to a communication network for controlling multi-point communications, the method comprising:
    receiving over the network at the control unit a user command message from a terminal device coupled to the network, wherein said user command message is for controlling a camera device;
    identifying at the control unit whether the user command message is intended for the control unit; and
    carrying out at least one command in the identified user command message.

23. The method of claim 22, further comprising forwarding at least one command in the identified user command message to a second terminal device via the network.

24. The method of claim 23, wherein the second terminal device is a video conference recorder.

25. The method of claim 22, wherein the user command message comprises a command for controlling a remote video camera.

26. The method of claim 22, wherein the user command message comprises a far end control command message.

27. A method of controlling a control unit adapted for coupling to a communication network for controlling multi-point communications, the method comprising:
    receiving over the network at the control unit a user command message from a terminal device coupled to the network;
    identifying at the control unit whether the user command message is intended for the control unit;
    carrying out at least one command in the identified user command message; and
    forwarding at least one command in the identified user command message to a second terminal device via the network, wherein the control unit forwards the at least one command in the identified user command message for a predetermined period of time.

28. A control unit adapted for coupling to a communication network for controlling multi-point communications, the control unit comprising:
    an input adapted to receive a user command message from a terminal device coupled to the network, wherein said user command message is for controlling a camera device, and to identify if the user command message is intended for the control unit; and
    a processor coupled to the input and adapted to process the user command message and to perform at least one command in the user command message.

29. The control unit of claim 28, wherein the user command message comprises a command for controlling a remote video camera and operation of the control unit is responsive to the command.

30. The control unit of claim 28, wherein the user command message comprises a far end camera control message.

31. A control unit adapted for controlling a video multi-point conference and connectable to a communication network, the control unit comprising:
    ab input for receiving a user command message from a terminal device, wherein said user command message comprises a far end camera control message;
    a processor coupled to the input and adapted to proces the far end camera control message and alter the composition of a video conference communication.

32. The control unit of claim 31, wherein the control unit is adapted to identify whether the far end camera control message is intended for the control unit and perform in response to the far end camera control message if intended for the control unit.

33. The control unit of claim 31, wherein the control unit is configured to:
    identify whether the far end camera control message is intended for the control unit or a second terminal device;
    perform the far end camera control message if intended for the control unit; and
    forward the far end camera control message if not intended for the control unit.

34. The control unit of claim 31, wherein the second terminal device comprises a video conference recorder.

35. The control unit of claim 31, wherein the second terminal device comprises a remote video camera.

36. The control unit of claim 31, further comprising an output coupled to the processor for forwarding the received far end camera control message.

* * * * *